Patented Nov. 15, 1949

2,487,829

UNITED STATES PATENT OFFICE 2,487,829

POLYVINYLPYRIDINIUM HALIDES

Lawrence Marion Richards, Wilmington, Del., assignor to E. I. du Pont de Nemours & Company, Wilmington, Del., a corporation of Delaware No Drawing. Application January 25, 1946,
Serial No. 643,478

7 Claims. (Cl. 260—88.3)

This invention relates to polymeric quaternary ammonium halides and more particularly to poly-N-alkyl-vinylpyridinium halides.

The invention has as an object the preparation of water-soluble polymeric substances, more particularly water-soluble polymeric quaternary ammonium salts.

This and other objects are accomplished by the production of poly-N-alkylvinylpyridinium halides. These polymeric halides are prepared in accordance with the invention, by reaction of an alkyl chloride, bromide, or iodide, with a solution of a polyvinylpyridine, e. g., by reacting ethyl bromide with the polymeric vinylpyridine dissolved in an inert solvent such as alcohol.

Polyvinylpyridine, for instance where the vinyl group is in the 2-position, may be characterized by having the following recurring unit:

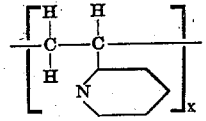

where $x$ is at least 10; and the aforesaid reaction between it and alkyl halide yields poly-N-alkylvinylpyridinium halides which may be characterized as having the following recurring unit:

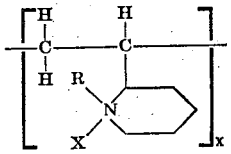

where $x$ is at least 10, R is alkyl, and X is chlorine, bromine, or iodine, except that, as shown by the examples hereinbelow, some of the nitrogen of the pyridine may not react with the alkyl halide, in which case both the R and the X on some of the nitrogens are both zero. In the practice of the invention, however, at least ten percent of the pyridine nitrogen generally reacts with the alkyl halide.

The following examples in which the parts given are by weight further illustrate the practice of this invention.

Example I

A solution of 10 parts of polyvinylpyridine in 90 parts of methanol was reacted with 10.5 parts of ethyl bromide at 60° C. for 12 hours. The resulting clear, viscous solution was evaporated to obtain the quaternary salt. Analysis for bromine indicated that the bromine content was 24.65% corresponding to a 49 mol per cent of reaction. The product was soluble in water and the resulting solution was surface-active.

Example II

A solution of 5 parts of polymeric 5-ethyl-2-vinyl-pyridine in about 85 parts of toluene and 12.5 parts of stearyl bromide was sealed in the reaction vessel and heated with agitation for 4 hours at 150° C. The product was obtained as a precipitate, and was filtered and washed with petroleum ether. The increase in weight indicated that 30% of the nitrogen groups had been converted to the corresponding quaternary stearyl bromide derivative. The product was soluble in water.

The examples above indicate that alkyl bromides react readily with a polyvinylpyridine solution to give the corresponding quaternary salt. Alkyl chlorides also react with the polyvinylpyridine to give quaternary salts although the extent of reaction is usually not more than 10% to 15% of the maximum theoretical amount in the case of alkyl chlorides of 12 to 20 carbons. Alkyl iodides react readily. For water-soluble quaternary salts it is preferred that the bromides or iodides be employed. It is preferred that alkyl halides of from 1 to 20 carbons be employed.

The vinylpyridine polymers that can be employed in this invention include the nuclear-substituted alkyl vinylpyridines which may contain up to 6 alkyl carbons as side chains on each pyridine nucleus, for example, polymers from 5-ethyl-2-vinylpyridine, dimethyl vinylpyridine, etc. Polymers are readily obtained from the monomeric vinylpyridines by customary polymerization techniques for example, by polymerization in an aqueous emulsion at a pH of greater than 9 with a peroxide polymerization catalyst such as potassium persulfate.

The polymerized vinylpyridine is preferably dissolved in a solvent such as methanol although any inert solvent can be employed and reacted with the alkyl halide. The reaction may be brought about at any temperature of from room temperature to 150–200° C. In general the temperature employed is selected on the basis of the activity of the halide, for example, a chloride is usually less active than a bromide or iodide and the chloride is preferably reacted at a higher temperature.

The products of this invention are useful, e. g., as surface-active agents and as fungicides, insecticides, and bactericides.

I claim:
1. A poly-N-alkyl 2-vinylpyridinium bromide.
2. Poly-N-alkyl 2-vinylpyridinium chloride.
3. Poly-N-alkyl 2-vinylpyridinium iodide.
4. Poly-N-ethyl 2-vinyl 5-ethylpyridinium bromide.
5. The process of preparing poly-N-alkylvinylpyridinium halides which comprises mixing a polymeric vinylpyridine containing not over two alkyl carbons on each pyridine nucleus, and an alkyl halide selected from the class consisting of alkyl chloride, alkyl bromide, and alkyl iodide and heating at a temperature of from room temperature to 200° C. in the presence of an inert solvent for the polyvinylpyridine, to form poly-N-alkyl-vinylpyridinium halide.
6. Material of the group consisting of poly-N-alkyl 2-vinylpyridinium bromide, poly-N-alkyl 2-vinylpyridinium chloride, and poly-N-alkyl 2-vinylpyridinium iodide.
7. The process of claim 5 wherein the temperature is maintained at 60° C. to 150° C.

LAWRENCE MARION RICHARDS.

REFERENCES CITED

The following references are of record in the file of this patent:

UNITED STATES PATENTS

| Number | Name | Date |
|---|---|---|
| 2,242,224 | Bley | May 20, 1941 |

FOREIGN PATENTS

| Number | Country | Date |
|---|---|---|
| 849,126 | France | Nov. 14, 1939 |